United States Patent
Li et al.

(10) Patent No.: US 8,478,591 B2
(45) Date of Patent: Jul. 2, 2013

(54) PHONETIC VARIATION MODEL BUILDING APPARATUS AND METHOD AND PHONETIC RECOGNITION SYSTEM AND METHOD THEREOF

(75) Inventors: Huan-Chung Li, Taipei (TW);
Chung-Hsien Wu, Tainan (TW);
Han-Ping Shen, Taichung (TW);
Chun-Kai Wang, Shulin (TW);
Chia-Hsin Hsieh, Yongkang (TW)

(73) Assignee: Institute for Information Industry, Taipei (TW)

( * ) Notice: Subject to any disclaimer, the term of this patent is extended or adjusted under 35 U.S.C. 154(b) by 868 days.

(21) Appl. No.: 12/637,990

(22) Filed: Dec. 15, 2009

(65) Prior Publication Data
US 2011/0119051 A1    May 19, 2011

(30) Foreign Application Priority Data
Nov. 17, 2009   (TW) .................................. 98138964 A (51) Int. Cl.
*G10L 15/06* (2006.01)
*G10L 15/00* (2006.01)

(52) U.S. Cl.
USPC .......................................... 704/243; 704/231

(58) Field of Classification Search
USPC .................................................. 704/231–257
See application file for complete search history.

(56) References Cited

U.S. PATENT DOCUMENTS

| | | | | |
|---|---|---|---|---|
| 2004/0148161 | A1* | 7/2004 | Das et al. | 704/224 |
| 2007/0294082 | A1* | 12/2007 | Jouvet et al. | 704/231 |
| 2009/0119105 | A1* | 5/2009 | Kim et al. | 704/244 |
| 2010/0121640 | A1* | 5/2010 | Zheng et al. | 704/240 |

FOREIGN PATENT DOCUMENTS

CN   101226743   7/2008

OTHER PUBLICATIONS

Kim, M.; Yoo Rhee Oh; Hong Kook Kim; , "Non-native pronunciation variation modeling using an indirect data driven method," Automatic Speech Recognition & Understanding, 2007. ASRU. IEEE Workshop on , vol., No., pp. 231-236, Dec. 9-13, 2007.*
English language translation of abstract of CN 101226743 (published Jul. 23, 2008).

* cited by examiner

*Primary Examiner* — Samuel G Neway
(74) *Attorney, Agent, or Firm* — McClure, Qualey & Rodack, LLP (57) ABSTRACT

A phonetic variation model building apparatus, having a phoneme database for recording at least a standard phonetic model of a language and a plurality of non-standardized phonemes of the language is provided. A phonetic variation identifier identifies a plurality of phonetic variations between the non-standardized phonemes and the standard phonetic model. A phonetic transformation calculator calculates a plurality of coefficients of a phonetic transformation function based on the phonetic variations and the phonetic transformation function. A phonetic variation model generator generates at least a phonetic variation model based on the standard phonetic model, the phonetic transformation function and the coefficients thereof.

10 Claims, 8 Drawing Sheets

PHONETIC VARIATION MODEL BUILDING APPARATUS AND METHOD AND PHONETIC RECOGNITION SYSTEM AND METHOD THEREOF

CROSS REFERENCE TO RELATED APPLICATIONS

This Application claims priority of Taiwan Patent Application No. 098138964, filed on Nov. 17, 2009, the entirety of which is incorporated by reference herein.

BACKGROUND OF THE INVENTION

1. Field of the Invention

The present invention relates to phonetic variation model building apparatuses and methods, and in particular relates to phonetic recognition systems and methods using phonetic variation model building apparatuses and methods.

2. Description of the Related Art

For same languages, accents of different groups of speakers may differ due to regional or social status norms and practices. Moreover, language accents may be influenced by second language speakers. For example, a person whose first language is Hokkien (a Chinese dialect) may speak Mandarin Chinese (the official Chinese dialect) with the Hokkien accent, or a person whose first language is Mandarin Chinese may speak English with the Chinese accent. Relative to the standard languages (Chinese and English), these non-standardized accents (such as to speek Chinese with the Hokkien accent or to speek English with the Chinese accent) are called "phonetic variations". For conventional phonetic recognition devices (or speech recognition system/software), non-standardized accents (non-standardized phonemes) usually result in a low recognition rates.

Accordingly, phonetic variation models, which account for some non-standardized phonemes, in phonetic recognition devices, have been developed. However, phonetic recognition devices having phonetic variation models are costly as much time and manual labor is required. Moreover, with about 7,000 languages in the world, potentially having corresponding influences therebetween, the amount of phonemes which may be identified for a single language is extremely large. Thus, conventionally, only a limited amount of non-standardized phonemes are identified in conventional phonetic variation models.

Therefore, a phonetic recognition system and method using a phonetic variation model building apparatus and method is desired, wherein an ideal amount of phonetic variation models may be achieved without individually identifying a large amount of non-standardized phonemes.

BRIEF SUMMARY OF THE INVENTION

The present invention provides a phonetic variation model building apparatus, comprising: a phoneme database for recording at least a standard phonetic model of a language and a plurality of non-standardized phonemes of the language; a phonetic variation identifier for identifying a plurality of phonetic variations between the non-standardized phonemes and the standard phonetic model; a phonetic transformation calculator for calculating a plurality of coefficients of a phonetic transformation function based on the phonetic variations and the phonetic transformation function; and a phonetic variation model generator for generating at least a phonetic variation model based on the standard phonetic model, the phonetic transformation function and the coefficients thereof.

The present invention further provides a phonetic variation model building apparatus as above, wherein the phonetic variation model building apparatus is used in a phonetic recognizing system, and the phonetic recognizing system further comprising: a voice input device for inputting a voice; and a phonetic recognizing device for recognizing the voice based on at least a standard phonetic model and at least a phonetic variation model generated by the phonetic variation model building apparatus.

The present invention further provides a phonetic variation model building method, comprising: providing at least a standard phonetic model of a language and a plurality of non-standardized phonemes of the language; identifying a plurality of phonetic variations between the non-standardized phonemes and the standard phonetic model; generating a plurality of coefficients of a phonetic transformation function based on the phonetic variations and the phonetic transformation function; and generating at least a phonetic variation model based on the standard phonetic model, the phonetic transformation function and the coefficients thereof.

The present invention further provides a phonetic variation model building method as above, wherein the phonetic variation model building method is used in a phonetic recognition method, and the phonetic recognition method further comprises: inputting a voice via a voice input device; and recognizing voice based on at least a standard phonetic model and at least a generated phonetic variation model.

The present invention further provides a computer program, stored in an electronic apparatus, readable by the electronic apparatus for performing a phonetic variation model building method, wherein the method comprises: providing at least a standard phonetic model of a language and a plurality of non-standardized phonemes of the language; identifying a plurality of phonetic variations between the non-standardized phonemes and the standard phonetic model; generating a plurality of coefficients of a phonetic transformation function based on the phonetic variations and the phonetic transformation function; and generating at least a phonetic variation model based on the standard phonetic model, the phonetic transformation function and the coefficients thereof. A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
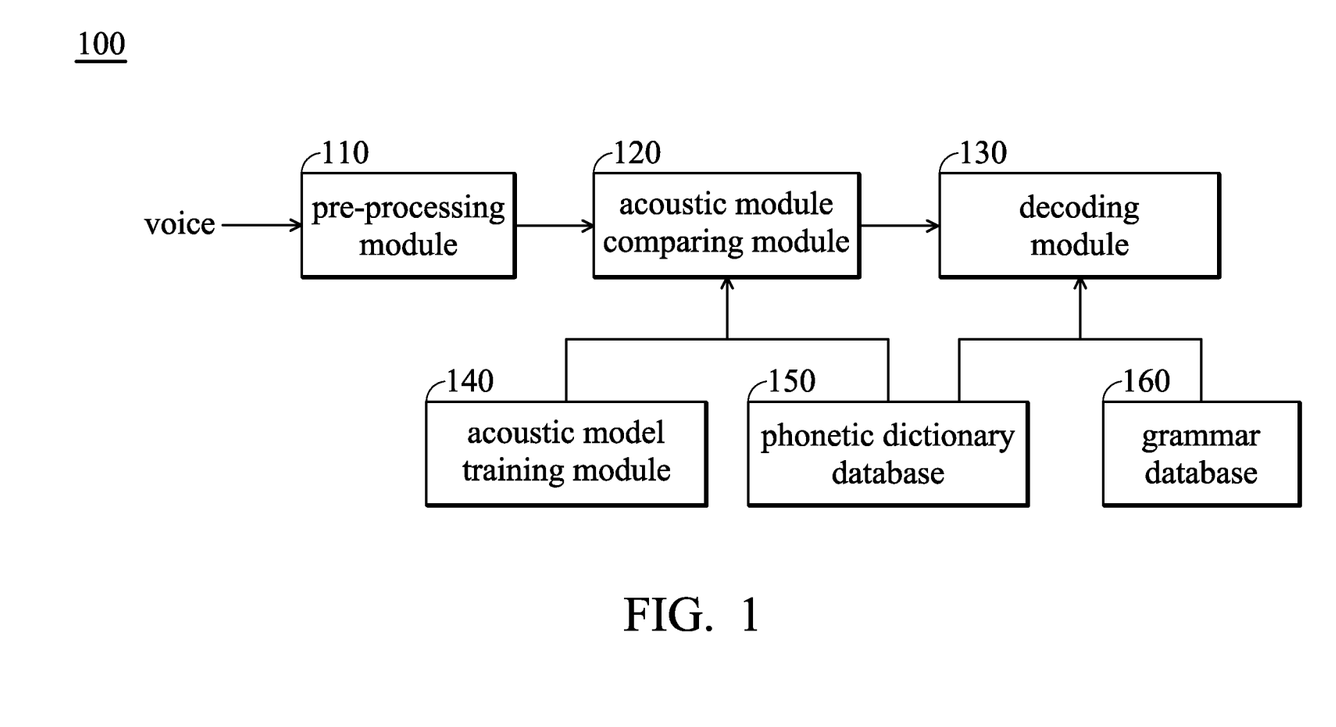
FIG. 1 is a schematic diagram of a phonetic recognition device in the prior art.

FIG. 1 is a schematic diagram of a phonetic recognition device in the prior art. The phonetic recognition device 100 comprises a pre-processing module 110, an acoustic module comparing module 120, a decoding module 130, an acoustic model training module 140, a phonetic dictionary database 150 and a grammar database 160. The pre-processing module 110 pre-processes input voices and outputs the pre-processed voices to the acoustic model comparing module 120. Then, the acoustic model comparing module 120 compares the pre-processed voices with an acoustic model trained from the acoustic model training module 140. For example, the acoustic model could be a standard phonetic model or a non-standardized phonetic model (phonetic variation model) of a language. Next, the decoding module 130 recognizes the meaning of the processed voices from the acoustic model comparing module 120 by corresponding voices to the phonetic dictionary database 150 and the grammar database 160. The recognized result of the decoding module 130, for example, may be a comprehensible phrase.

Figure 2:
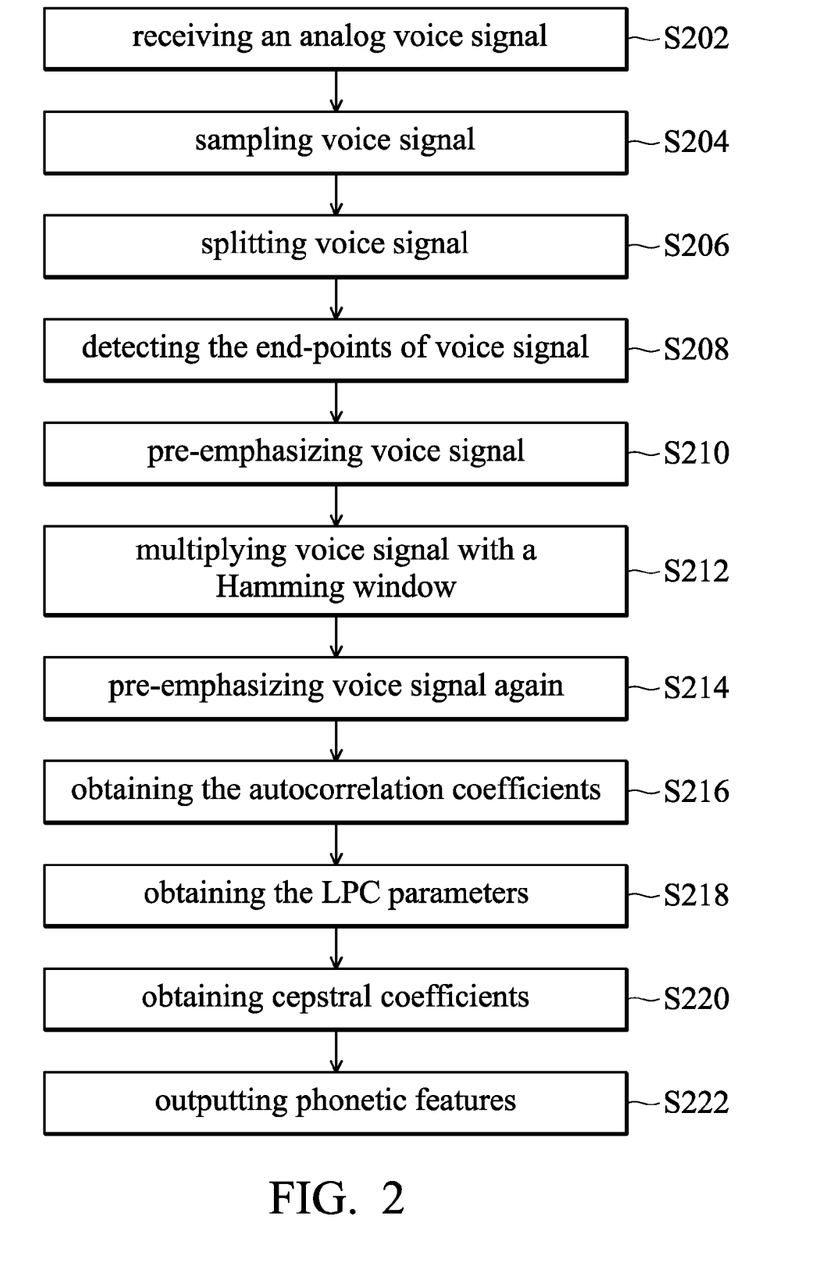
FIG. 2 is a flow chart of the pre-processing process performed by the pre-processing module of FIG. 1.

FIG. 2 is a flow chart of the pre-processing process performed by the pre-processing module of FIG. 1 110. The pre-processing process 200 comprises: receiving an analog voice signal in step S202, sampling voice signal in step S204, splitting voice signal in step S206, detecting the end-points of voice signal in step S208, pre-emphasizing voice signal in step S210, multiplying voice signal with a Hamming window in step S212, pre-emphasizing voice signal again in step S214, obtaining the autocorrelation coefficients in step S216, obtaining the LPC parameters in step S218, obtaining cepstral coefficients in step S220, and outputting phonetic features in step S222. The pre-processing process 200 is used to provide the phonetic features for the acoustic module comparing module 120 for comparison.

Figure 3:
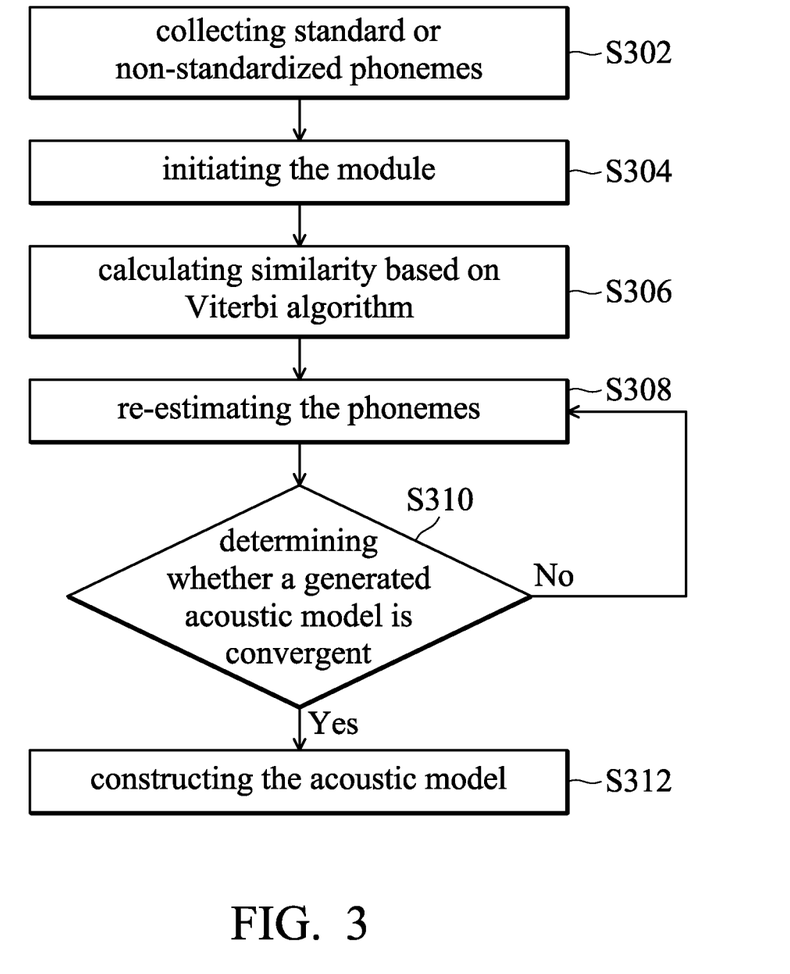
FIG. 3 is a flow chart of the acoustic model training process performed by the acoustic model training module of FIG. 1.

The acoustic model training module 140 is used to provide an acoustic model (as basis for comparing) for the acoustic module comparing module 120. FIG. 3 is a flow chart of the acoustic model training process performed by the acoustic model training module 140 of FIG. 1. The acoustic model training process 300 comprises: collecting standard or non-standardized phonemes in step S302; initiating the module in step S304; calculating similarity based on Viterbi algorithm in step S306; determining whether a generated acoustic model is convergent in step S310, and if yes, constructing the acoustic model in step S312; and if not, re-estimating the phonemes in step S308. For recognizing a voice of a language, it is necessary to construct the acoustic models for all of the phonemes of the language. For example, the Hidden Makov Model (HMM) can be used in this acoustic model training process 300, and is well-known in the prior art and not discussed further for brevity.

Since voices to be recognized will be further compared with the acoustic models constructed, robust acoustic models are built. Since the collecting step S302 is the essential step of the acoustic model training process 300, the objective of the present invention is to reduce the amount of the collecting non-standardized phonemes and build the phonetic variation models automatically and systematically. The embodiment of the present invention will be illustrated as follows.

Figure 4:
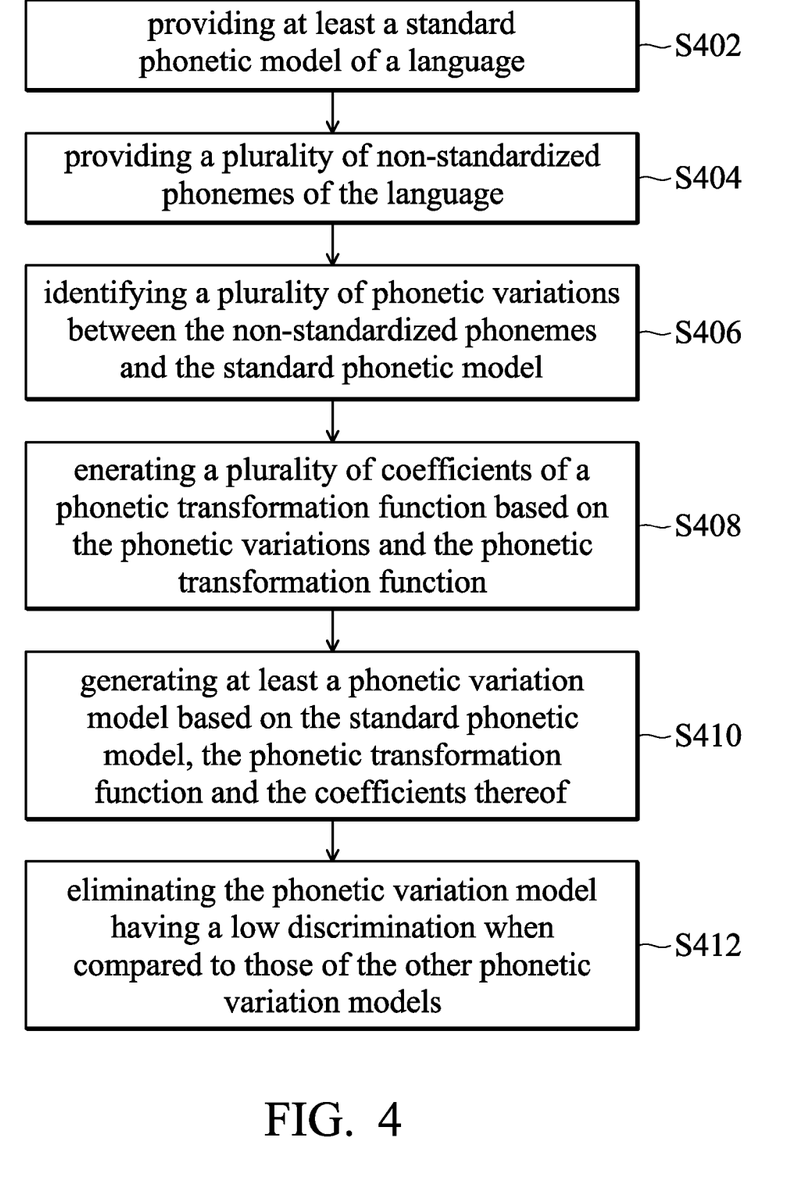
FIG. 4 is a flow chart of a phonetic variation model building method according to an embodiment of the present invention.

FIG. 4 is a flow chart of a phonetic variation model building method according to an embodiment of the present invention. The phonetic variation model building method 400 comprises: in step S402, providing at least a standard phonetic model of a language; in step S404, providing a plurality of non-standardized phonemes of the language; in step S406, identifying a plurality of phonetic variations between the non-standardized phonemes and the standard phonetic model; in step S408, generating a plurality of coefficients of a phonetic transformation function based on the phonetic variations and the phonetic transformation function; in step S410, generating at least a phonetic variation model based on the standard phonetic model, the phonetic transformation function and the coefficients thereof; and in step S412, eliminating the phonetic variation model which has a low discrimination compared with the other phonetic variation models.

A phonetic variation model for Chinese (language) is built in this embodiment for illustration. In this embodiment, standard phonetic models of Chinese are provided in step S402, where the standard phonetic models comprise the acoustic models for all phonemes in Chinese. Next, non-standardized phonemes of Chinese with the Hokkien accent are provided in step S404. Note that the present invention minimizes collecting non-standardized phonemes, thus it is not necessary to collect all of the non-standardized phonemes of Chinese with the Hokkien accent.

Then, the method of the present invention proceeds to step S406. The step S406 further identifies a plurality of phonetic variations between the non-standardized phonemes (Chinese with the Hokkien accent) and the standard phonetic model (Chinese). Specifically, by comparing similarity between a non-standardized phoneme and a standard phoneme in the acoustic model, a phonetic variation may be identified. In general, a language may be sorted into a plurality of phonetic features, and each of the standard phonetic model and the non-standardized phonemes respectively corresponds to one of these phonetic features. As such, the method of the present invention may identify the phonetic variations between the non-standardized phonemes and the standard phonetic model of the same phonetic features. For example, the International Phonetic Alphabet (IPA) as shown in Table 1 may be used as the phonetic features, but the present invention is not limited thereto.

TABLE 1

| Phonetic features | Alphabet |
| --- | --- |
| Voiced plosive | B, D, G |
| Unvoiced plosive | P, T, K |
| Fricatives | F, S, SH, H, X, V, TH, DH |
| Affricatives | Z, ZH, C, CH, J, Q, CH, JH |
| Nasals | M, N, NG |
| Liquids | R, L |
| Glides | W, Y |
| Front vowels | I, ER, V, EI, IH, EH, AE |
| Central vowels | ENG, AN, ANG, EN, AH, UH |
| Back rounded vowels | O |
| Back unrounded vowels | A, U, OU, AI, AO, E, EE, OY, AW |

Figure 5:
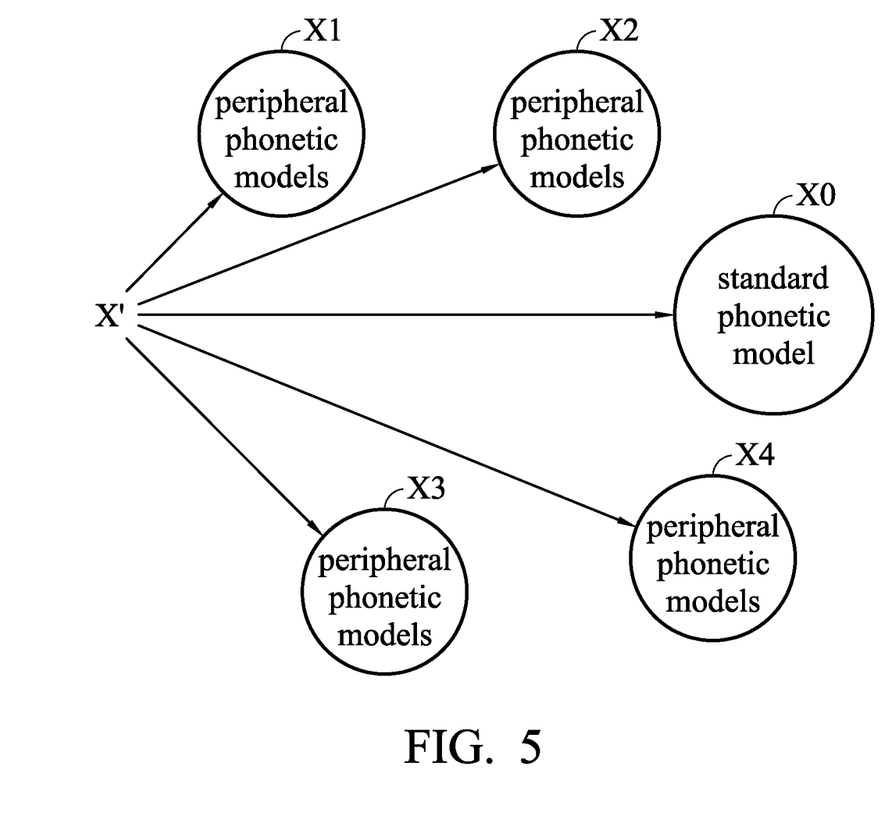
FIG. 5 shows the relationship between a standard phonetic model and peripheral phonetic models thereof according to an embodiment of the present invention.

For example, the method of the present invention comprises calculating differences between the non-standardized phonemes (Chinese with the Hokkien accent) and the standard phonetic model (Chinese) according to phonetic feature parameters such as Mel-frequency cepstral coefficients (MFCC), Euclidean distances or Mahalanobis distances to identify the phonetic variations between the non-standardized phonemes (Chinese with the Hokkien accent) and the standard phonetic model (Chinese). Specifically, senones (the term "senone" means a Markov state representative of a cluster of similar Markov states) of the phonetic variations are identified in step S406 according to Eq. 1 and 2 as follows:

$$P_{verification}(x) = \log g(x \mid \lambda_{correct}) - \log g(x \mid \lambda_{anti-model}) \quad \text{(Eq. 1)}$$

$$g(x \mid \lambda_{anti-model}) = \frac{1}{N}\sum_{n=1}^{N} g(x \mid \lambda_n) \quad \text{(Eq. 2)}$$

where "$P_{verification}(x)$" is confidence level for the correctness of the senone "x"; "g" is a recognition estimating function; "$\lambda_{correct}$" is a correct phonetic model of the senone X; "$\lambda_{anti-model}$" are acoustic models most similar to the correct phonetic model, and "N" is the number of the phonetic model most similar to the correct phonetic model. When the $P_{verification}(x)$ is less than a threshold value, the corresponding senone x may be a phonetic variation. Note that, in other embodiments, the standard phonetic model can further comprise or be replaced by the other phonetic model (such as peripheral phonetic model) to be a basis for comparison. For example, as shown in FIG. 5, when the standard phonetic model X0 (Chinese) and its peripheral phonetic models X1~X4 (Beijing Chinese, Shanghai Chinese, Guangzhou Chinese, Hunan Chinese, etc.) are provided, the step S406 may further identify a plurality of phonetic variations between the non-standardized phonemes X' (Chinese with the Hokkien accent) and the peripheral phonetic models X1~X4.

Then, the method of the present invention proceeds to step S408. The step S408 calculates coefficients of a phonetic transformation function based on the phonetic variations and the phonetic transformation function obtained from step S406, wherein the coefficients are necessary and the parts of the phonetic transform function. In this case, the relationship between the standard phonetic model and non-standardized phonemes is assumed to be linear (y=ax+b) or nonlinear (y=ax^2+bx+c), and a regression or EM algorithm may be used to calculate the phonetic transformation function. Further, the step S408 may employ the EM algorithm to obtain the phonetic transformation function as follows:

$$P(X, Y \mid \lambda) = \quad \text{(Eq. 3)}$$
$$\sum_{\forall q} P(X, Y, q \mid \lambda) = \sum_{\forall q} \pi_{q_0} \prod_{t=1}^{M} a_{q_{t-1}q_t} b_{q_t}(x_t, y_t)$$

and;

$$b_j(x_t, y_t) = b_j(y_t \mid x_t)b_j(x_t) \quad \text{(Eq. 4-1~3)}$$
$$b_j(y_t \mid x_t) = N(y_t; A_j x_t + R_j, \Sigma_j^y)$$
$$b_j(x_t) = N(x_t; \mu_j^x, \Sigma_j^x)$$

wherein "π" is initial probability; "a" is probability for status transfer; "b" is probability for status observation; "q" is a status variable; "J" is a status indicator; "t" is a time indicator; and "Σ" is a variance. The EM algorithm further comprises an E step and an M step, wherein a Q function is obtained in the E step as follows:

$$Q(\lambda' \mid \lambda) = \sum_{q} P(q \mid O, \lambda) \log P(O, q \mid \lambda') \quad \text{(Eq. 5)}$$

$$\log P(O, q \mid \lambda') = \log \pi'_{q_1} + \sum_{t=1}^{T} \log a'_{q_{t-1}q_t} + \sum_{t=1}^{T} \log b'_{q_t}(O_t) \quad \text{(Eq. 6)}$$

$$O = \{X, Y\} = \{x_1, y_1, \ldots, x_T, y_T\} \quad \text{(Eq. 7)}$$

and, the maximized Q function is obtained in an M step as follows:

$$\hat{\lambda}' = \underset{\lambda'}{\mathrm{argmax}} Q(\lambda' \mid \lambda) \quad \text{(Eq. 8)}$$

$$\pi'_i = \frac{r_1(i)}{\sum_{i=1}^{N} r_1(i)} = r_1(i) \quad \text{(Eq. 9)}$$

$$a'_{ij} = \frac{\sum_{t=1}^{T} \xi_t(i, j)}{\sum_{j=1}^{N}\sum_{t=1}^{T} \xi_t(i, j)} = \frac{\sum_{t=1}^{T} \xi_t(i, j)}{\sum_{t=1}^{T} r_t(i)} \quad \text{(Eq. 10)}$$

$$\mu_j^{x'} = \frac{1}{T}\sum_{t=1}^{T} r_t(j)x_t \quad \text{(Eq. 11)}$$

$$\Sigma_j^{x'} = \frac{1}{T}\sum_{t=1}^{T} r_t(j)(x_t - \mu_j^{x'})(x_t - \mu_j^{x'})^T \quad \text{(Eq. 12)}$$

$$A'_j = \left(\sum_{t=1}^{T} r_t(j)(y_t - R_j)x_t^T\right)\left(\sum_{t=1}^{T} r_t(j)x_t x_t^T\right)^{-1} \quad \text{(Eq. 13)}$$

$$R'_j = \frac{\sum_{t=1}^{T} r_t(j)(y_t - A'_j x_t)}{\sum_{t=1}^{T} r_t(j)} \quad \text{(Eq. 14)}$$

$$\Sigma_j^{y'} = \frac{\sum_{t=1}^{T} r_t(j)(y_t - A'_j x_t - R'_j)(y_t - A'_j x_t - R'_j)^T}{\sum_{t=1}^{T} r_t(j)} \quad \text{(Eq. 15)}$$

Next, the method of the present invention proceeds to step S410. The step S410 generates at least a phonetic variation model (Chinese with the Hokkien accent, in this case) based on the standard phonetic model, the phonetic transformation function and the coefficients thereof obtained from step S408. Next, the method of the present invention proceeds to step S412. The step S412 eliminates the phonetic variation model which has a low discrimination compared with the other phonetic variation models. Specifically, in one embodiment, the step S410 determines that a phonetic variation model which is undistinguishable from the other phonetic variation models has a low discrimination. In other embodiments, the step S410 determines that a phonetic variation model has a low discrimination when the phonetic variation model is used to recognize voices and has a high error rate as a result therefrom. In yet other embodiments, the step S410 determines that a phonetic variation model has a low discrimination when the distance between the phonetic variation model and the other phonetic variation models in a probability space is minimal. In yet still other embodiments, the step S410 determines whether the phonetic variation model has a low discrimination based on whether the phonetic variation model nearest to its corresponding phonetic models has a low discrimination is sparse.

Although there is only one language (Chinese) illustrated in foregoing embodiment, the phonetic variation model building method of the present invention may be implemented for a plurality of languages, and cross-language phonetic variation models may be established. For example, in an embodiment, the method of the present invention provides: the standard phonetic models of several languages (ex. Chinese, English and Japanese) and some non-standardized phonemes (ex. either of Chinese English, Chinese Japanese, English Chinese, English Japanese, Japan Chinese and Japan English); identifies a plurality of phonetic variations from each of the languages (Chinese, English and Japanese); calculates a plurality of coefficients of a phonetic transformation function for each of the languages (Chinese, English and Japanese); and generates a plurality of phonetic variation models (for the at least one of Chinese English, Chinese Japanese, English Chinese, English Japanese, Japan Chinese and Japan English) for the languages. Those skilled in the art will appreciate that the method of the present invention can be implemented for other languages.

Figure 6:
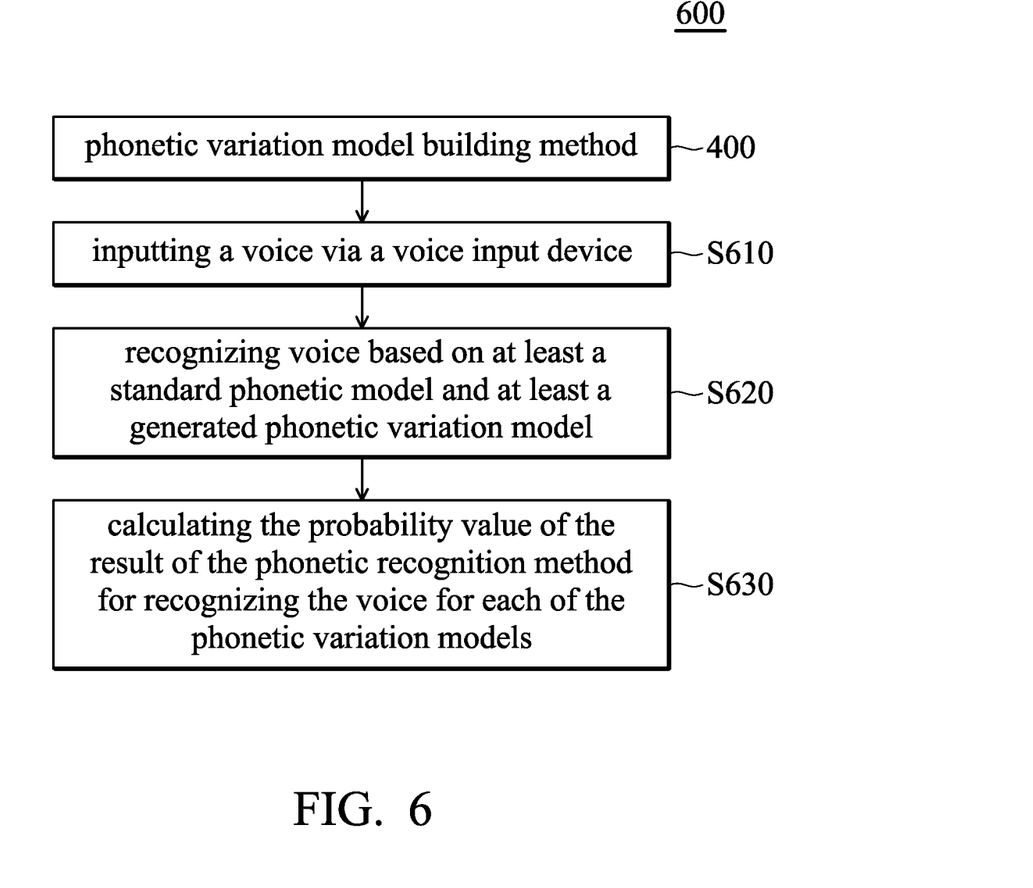
FIG. 6 is a flow chart of a phonetic recognition method according to an embodiment of the present invention.

The phonetic variation model building method of the present invention has been fully described in the foregoing paragraphs. The present invention here further provides a phonetic recognition method. FIG. 6 is a flow chart of a phonetic recognition method according to an embodiment of the present invention. The phonetic recognition method comprises: inputting a voice via a voice input device in step S610; generating at least a phonetic variation model by the phonetic variation model building method 400 as mentioned previously; recognizing voice based on at least a standard phonetic model and at least a generated phonetic variation model in step S620, and calculating the probability value of the result of the phonetic recognition method for recognizing the voice for each of the phonetic variation models in step S630. After recognizing process and calculating process, the phonetic variation model of the highest probability value is output as the final result.

The phonetic recognition method of the present invention is not only for recognizing single accents of a language but also for recognizing multiple accents of multiple languages. The method of the present invention further comprises: providing a plurality of languages; generating a plurality of phonetic variation models for each of the languages; and recognizing a voice based on at least a standard phonetic model and at least a phonetic variation model. By using the method of the present invention, common language accents may be recognized easily and clearly.

Figure 7:
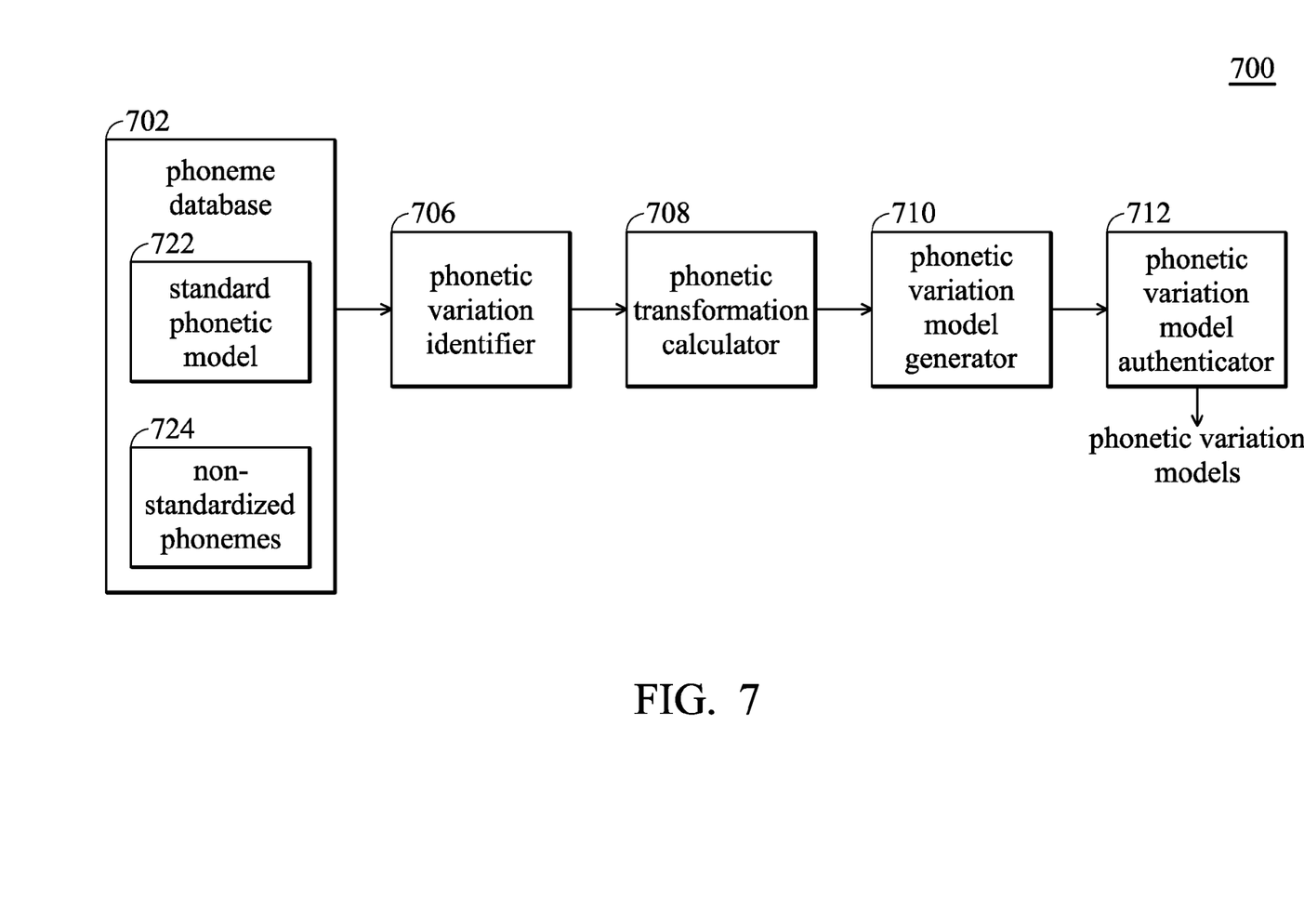
FIG. 7 is a schematic diagram of a phonetic variation model building apparatus according to an embodiment of the present invention.

In addition to the phonetic variation model building method mentioned previously, the present invention further provides a phonetic variation model building apparatus. FIG. 7 is a schematic diagram of a phonetic variation model building apparatus according to an embodiment of the present invention. In this embodiment, each component of the phonetic variation model building apparatus 700 is respectively used to perform the steps S402~S412 of the phonetic variation model building method of the present invention. The phonetic variation model building apparatus 700 comprises a phoneme database 702, a phonetic variation identifier 706, a phonetic transformation calculator 708, a phonetic variation model generator 710 and a phonetic variation model authenticator 712. The phoneme database 722 is used to record at least a standard phonetic model 722 of a language and a plurality of non-standardized phonemes 724 of the language (corresponding to steps S402 and S404). The phonetic variation identifier 706 is used to identify a plurality of phonetic variations between the non-standardized phonemes and the standard phonetic model (corresponding to step S406). The phonetic transformation calculator 708 is used to calculate a plurality of coefficients of a phonetic transformation function based on the phonetic variations and the phonetic transformation function (corresponding to step S408). The phonetic variation model generator 410 is used to generates at least a phonetic variation model based on the standard phonetic model, the phonetic transformation function and the coefficients thereof (corresponding to step S410) and the phonetic variation model authenticator 710 is used to eliminates the phonetic variation model which has a low discrimination compared with the other phonetic variation models (corresponding to step S412). Since embodiments of the phonetic variation model building apparatus 700 and the algorithm used are the same as those of the phonetic variation model building method of the invention, further description will not be discussed for brevity.

Similarly, the phonetic variation model building apparatus 700 of the present invention may be used to build the phonetic variation models for multiple accents of multiple languages. For example, when the phoneme database 702 of the phonetic variation model building apparatus 700 records a plurality of languages (ex. Chinese, English and Japanese), the phonetic variation model generator 710 is used to generate a plurality of phonetic variation model (ex: Chinese English, Chinese Japanese, English Chinese, English Japanese, Japan Chinese and Japan English) for each of the languages.

Figure 8:
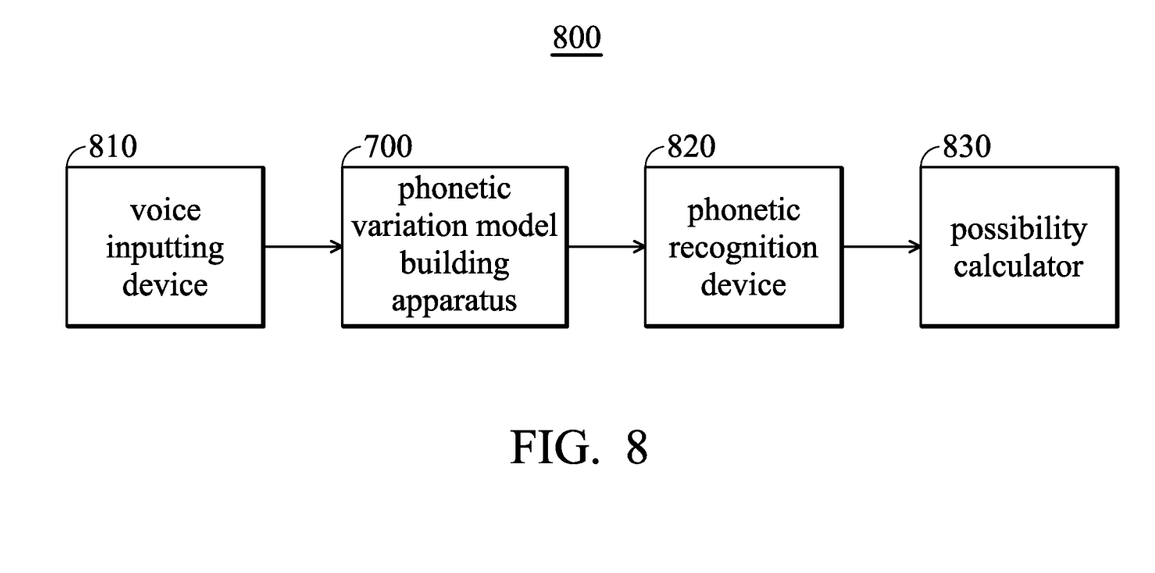
FIG. 8 is a schematic diagram of a phonetic recognition system according to an embodiment of the present invention.

The phonetic variation model building apparatus of the present invention has been fully described in the foregoing paragraphs. The present invention further provides a phonetic recognition system using the phonetic variation model building apparatus. FIG. 8 is a schematic diagram of a phonetic recognition system according to an embodiment of the present invention. The phonetic recognition system 800 of the present invention comprises a voice inputting device 810, the phonetic variation model building apparatus 700 mentioned previously, a phonetic recognition device 820, and a possibility calculator 830. The phonetic variation model building apparatus 700, as described, is used to generate at least a phonetic variation model. When voice input device 810 inputs a voice, the phonetic recognition device 820 may recognize voice based on at least a standard phonetic model and at least a phonetic variation model generated by the phonetic variation model building apparatus 700. The possibility calculator 830 may further calculate the probability value of the result of the phonetic recognition device 820 for recognizing the voice for each of the phonetic variation models. After recognizing process and calculating process, the phonetic variation model of the highest probability value is output as the final result.

The present invention further provides a computer program, which is stored in an electronic apparatus and readable by the electronic apparatus for performing the phonetic variation model building method mentioned previously. The phonetic variation model building method will not be discussed further for brevity.

By using the apparatus of the present invention, phonetic recognition may be greatly improved. An experiment is provided as follows to show the advantages of the present invention. The objective of the present experiment is to compare the phonetic recognition system using the present invention with that of the prior art. The experiment had four programs:

Program 1: The step S402 of the phonetic variation model building method of the present invention was performed, but not steps S404~S412, and then voices were recognized. In step S402, the standard phonetic model included 955 English sentences spoken by students majoring in English and was obtained from the English Across Taiwan (EAT) Database provided by the Association for Computational Linguistics and Chinese Language processing. Voices were recorded from female participants and in an audio file. Since the steps S404~S412 of the method of the present invention were not performed, Program 1 was accomplished within the scope of the prior art.

Program 2: The steps S402 and S404 of the phonetic variation model building method of the present invention was performed, but not the step S406~S412, and then voices were recognized which were the same as the voices recognized in Program 1. In step S402, the standard phonetic model used was the same as that in Program 1. In step 404, the non-standardized phonemes included 220 English sentences spoken by students "not" majoring in English and was obtained from the English Across Taiwan (EAT) Database provided by the Association for Computational Linguistics and Chinese Language processing.

Program 3: The steps S402 and S404 of the phonetic variation model building method of the present invention was performed, but not the steps S406~S412, and then voices were recognized which were the same as the voices in Program 1. In step S402, The standard phonetic model was the same as that in Program 1. In step S404, the non-standardized phonemes comprised 660 English sentences spoken by the students "not" majoring in English and was obtained from the English Across Taiwan (EAT) Database provided by the Association for Computational Linguistics and Chinese Language processing.

Program 4: The steps S402~S412 of the phonetic variation model building method of the present invention were performed, and then voices were recognized which were the same as the voices in Program 1. In step S402, The standard phonetic model was the same as that in Program 1. In step S404, the non-standardized phonemes comprised 220 English sentences spoken by the students "not" majoring in English and was obtained from the English Across Taiwan (EAT) Database provided by the Association for Computational Linguistics and Chinese Language processing.

The results of the four experimental programs are shown as follows:

TABLE 2

|  | Program | | | |
| --- | --- | --- | --- | --- |
|  | 1 | 2 | 3 | 4 |
| Amount of the phonetic variation models generated | 0 | 39 | 39 | 27 |
| Recognition rate | about 23% | about 41% | about 52% | about 52% |

Program 4 entirely applied the present invention to generate the phonetic variation models, and the other programs did not. Since Program 1 did not collect any non-standardized phonemes, no phonetic variation model was generated. Thus, the recognition system of Program 1 did not recognize non-standardized speech very well and had a poor recognition rate (about 23%). Program 2, was performed based on the prior art, collecting 220 non-standardized phonemes and then generating 39 phonetic variation models. Program 2 had a recognition rate of 41%. Program 3 collected more non-standardized phonemes (660 sentences, more than Program 2 by 3 times), generated as much phonetic variation models as Program 2 and had a recognition rate of 52%. Although Program 3 had an excellent recognition rate, however, a large amount of non-standardized phonemes was collected. Program 4 implemented the step S412 of the method of the present invention and thus eliminated 12 phonetic variation models which had low discrimination. By implementing the step S406~S408 of the method of the present invention, Program 4 achieved an excellent recognition rate (the same as the Program 3 but higher than program 2) with less effort for collecting non-standardized phonemes (⅓ of Program 3).

From the experiment, it was shown that the phonetic variation model building method of the present invention can reduce effort for collecting non-standardized phonemes and further improve the entire phonetic recognition rate of the phonetic recognition device or system.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A phonetic variation model building apparatus, comprising:
    a phoneme database for recording at least a standard phonetic model of a language and a plurality of non-standardized phonemes of the language;
    a phonetic variation identifier, coupled to the phoneme database, for identifying a plurality of phonetic variations between the non-standardized phonemes and the standard phonetic model;
    a phonetic transformation calculator comprising circuitry, coupled to the phonetic variation identifier, for calculating a plurality of coefficients of a phonetic transformation function based on the phonetic variations and the phonetic transformation function; and
    a phonetic variation model generator, coupled to the phonetic transformation calculator, for generating at least a phonetic variation model based on the at least a standard phonetic model, the phonetic transformation function and the coefficients thereof.

2. The phonetic variation model building apparatus as claimed in claim 1, wherein the language is sorted into a plurality of phonetic features, and each of the standard phonetic model and the non-standardized phonemes respectively corresponds to one of the phonetic features.

3. The phonetic variation model building apparatus as claimed in claim 2, wherein:
    the phonetic variation identifier identifies the phonetic variations between the non-standardized phonemes and the standard phonetic model of the same phonetic features;
    the phonetic transformation calculator calculates the coefficients of the phonetic transformation function based on the phonetic variation of the phonetic features and the phonetic transformation function corresponding to the phonetic features; and
    the phonetic variation model generator generates the phonetic variation model based on the phonetic transformation function corresponding to the phonetic features, coefficient thereof, and at least a standard phonetic model of the phonetic features.

4. The phonetic variation model building apparatus as claimed in claim 1 further comprising:
a phonetic variation model authenticator for eliminating the phonetic variation model which has a low discrimination compared with the other phonetic variation models.

5. The phonetic variation model building apparatus as claimed in claim 1, wherein the phoneme database further records a plurality of peripheral phonetic models of the language, and the phonetic variation identifier further identifies a plurality of phonetic variations respectively between the non-standardized phonemes and the standard phonetic model and between the non-standardized phonemes and the peripheral phonetic models.

6. The phonetic variation model building apparatus as claimed in claim 1, wherein a phoneme database further records at least a standard phonetic model of each of a plurality of languages and a plurality of non-standardized phonemes of these languages; a phonetic variation identifier further identifies a plurality of phonetic variations from each of the languages; a phonetic transformation calculator further calculates a plurality of coefficients of a phonetic transformation function for each of the languages; and a phonetic variation model generator further generates a plurality of phonetic variation models for each of the languages.

7. The phonetic variation model building apparatus as claimed in claim 1, wherein the phonetic variation model building apparatus is used in a phonetic recognizing system, and the phonetic recognizing system further comprises:
a voice input device for inputting a voice; and
a phonetic recognition device for recognizing voice based on at least a standard phonetic model and at least a phonetic variation model generated by the phonetic variation model building apparatus.

8. The phonetic variation model building apparatus as claimed in claim 7, wherein the phonetic recognizing system further comprises:
a probability calculator for calculating the probability value of the result of the phonetic recognition device for recognizing the voice for each of the phonetic variation models.

9. The phonetic variation model building apparatus as claimed in claim 7, wherein: the phoneme database of the phonetic variation model building apparatus further records sounds from a plurality of languages, and the phonetic variation model generator of the phonetic variation model building apparatus further generates a plurality of phonetic variation models for each of the languages; and the phonetic recognition device further employs at least a standard phonetic model and at least a phonetic variation model to recognize voice.

10. A computer program product, stored in an electronic apparatus, readable by the electronic apparatus for performing a phonetic variation model building method, wherein the method comprises:
providing at least a standard phonetic model of a language and a plurality of non-standardized phonemes of the language;
identifying a plurality of phonetic variations between the non-standardized phonemes and the standard phonetic model;
generating a plurality of coefficients of a phonetic transformation function based on the phonetic variations and the phonetic transformation function; and
generating at least a phonetic variation model based on the at least a standard phonetic model, the phonetic transformation function and the coefficients thereof.

\* \* \* \* \*